US006527152B1

(12) United States Patent
Mason-Owens

(10) Patent No.: US 6,527,152 B1
(45) Date of Patent: Mar. 4, 2003

(54) CRUTCH HOLDING DEVICE

(76) Inventor: Dawn C. Mason-Owens, 201 Triunfo Canyon Rd., #146, Westlake Village, CA (US) 91361

( * ) Notice: Subject to any disclaimer, the term of this patent is extended or adjusted under 35 U.S.C. 154(b) by 3 days.

(21) Appl. No.: 09/797,616

(22) Filed: Mar. 5, 2001

(51) Int. Cl.$^{7}$ .................................................. B60R 9/00
(52) U.S. Cl. ....................................... 224/407; 224/572
(58) Field of Search ................................ 224/451, 409, 224/411, 572, 407; D3/10, 11; 280/304.1, 243, 250.1; 297/452.13, DIG. 4; 135/65, 66, 67, 68

(56) References Cited

U.S. PATENT DOCUMENTS

| | | | | | |
|---|---|---|---|---|---|
| 2,577,713 | A | * | 12/1951 | Nogle | 224/913 |
| 4,577,903 | A | * | 3/1986 | Wells | 224/407 |
| 4,995,537 | A | * | 2/1991 | Thedieck | 224/273 |
| 5,012,963 | A | | 5/1991 | Rosenbaum | |
| 5,040,711 | A | * | 8/1991 | Niederhauser et al. | 224/904 |
| 5,143,266 | A | * | 9/1992 | Heckerman et al. | 224/150 |
| 5,154,331 | A | | 10/1992 | Sanders | |
| 5,180,181 | A | * | 1/1993 | Letechipia | 224/407 |
| 5,288,001 | A | | 2/1994 | Locarno | |
| 5,544,797 | A | * | 8/1996 | Silva | 224/311 |
| 5,664,713 | A | | 9/1997 | Burgstahler | |
| D403,503 | S | | 1/1999 | Evans | |

* cited by examiner

*Primary Examiner*—Stephen K. Cronin
*Assistant Examiner*—Maerena W. Brevard

(57) ABSTRACT

A crutch holding device for holding a pair of crutches against a wheelchair. The crutch holding device includes an elongated flexible member having a first end and a second end. Each of the first and second ends defines a loop. Handles of a wheelchair may be extended through the loops. A first panel has a pair of side edges. Each of the side edges of the first panel is attached to the elongated flexible member such that the first panel is abutting the elongated flexible member. The first panel is positioned nearer the first end than the second end of the elongated flexible member. A second panel has a pair of side edges. Each of the side edges of the second panel is attached to the elongated flexible member such that the second panel is abutting the elongated flexible member. The second panel is positioned nearer the second end than the first end of the elongated flexible member. Each one of a pair of crutches is positioned between one of the first and second panels and the elongated member such that the elongated flexible member holds the crutches to the wheelchair.

10 Claims, 3 Drawing Sheets

CRUTCH HOLDING DEVICE

BACKGROUND OF THE INVENTION

1. Field of the Invention

The present invention relates to crutch holding devices and more particularly pertains to a new crutch holding device for holding a pair of crutches against a wheelchair.

2. Description of the Prior Art

The use of crutch holding devices is known in the prior art. More specifically, crutch holding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,154,331; U.S. Pat. No. 5,664,713; U.S. Pat. No. 5,288,001; U.S. Pat. No. 5,012,963; U.S. Pat. No. 4,577,903; U.S. Pat. No. Des. 403,503.

While these devices fulfill their respective, particular objectives and requirements, the aforementioned patents do not disclose a new crutch holding device. The inventive device includes an elongated flexible member having a first end and a second end. Each of the first and second ends defines a loop. Handles of a wheelchair may be extended through the loops. A first panel has a pair of side edges. Each of the side edges of the first panel is attached to the elongated flexible member such that the first panel is abutting the elongated flexible member. The first panel is positioned nearer the first end than the second end of the elongated flexible member. A second panel has a pair of side edges. Each of the side edges of the second panel is attached to the elongated flexible member such that the second panel is abutting the elongated flexible member. The second panel is positioned nearer the second end than the first end of the elongated flexible member. Each one of a pair of crutches is positioned between one of the first and second panels and the elongated member such that the elongated flexible member holds the crutches to the wheelchair.

In these respects, the crutch holding device according to the present invention substantially departs from the conventional concepts and designs of the prior art, and in so doing provides an apparatus primarily developed for the purpose of holding a pair of crutches against a wheelchair.

SUMMARY OF THE INVENTION

In view of the foregoing disadvantages inherent in the known types of crutch holding devices now present in the prior art, the present invention provides a new crutch holding device construction wherein the same can be utilized for holding a pair of crutches against a wheelchair.

The general purpose of the present invention, which will be described subsequently in greater detail, is to provide a new crutch holding device apparatus and method which has many of the advantages of the crutch holding devices mentioned heretofore and many novel features that result in a new crutch holding device which is not anticipated, rendered obvious, suggested, or even implied by any of the prior art crutch holding devices, either alone or in any combination thereof.

To attain this, the present invention generally comprises an elongated flexible member having a first end and a second end. Each of the first and second ends defines a loop. Handles of a wheelchair may be extended through the loops.

A first panel has a pair of side edges. Each of the side edges of the first panel is attached to the elongated flexible member such that the first panel is abutting the elongated flexible member. The first panel is positioned nearer the first end than the second end of the elongated flexible member. A second panel has a pair of side edges. Each of the side edges of the second panel is attached to the elongated flexible member such that the second panel is abutting the elongated flexible member. The second panel is positioned nearer the second end than the first end of the elongated flexible member. Each one of a pair of crutches is positioned between one of the first and second panels and the elongated member such that the elongated flexible member holds the crutches to the wheelchair.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new crutch holding device apparatus and method which has many of the advantages of the crutch holding devices mentioned heretofore and many novel features that result in a new crutch holding device which is not anticipated, rendered obvious, suggested, or even implied by any of the prior art crutch holding devices, either alone or in any combination thereof.

It is another object of the present invention to provide a new crutch holding device which may be easily and efficiently manufactured and marketed.

It is a further object of the present invention to provide a new crutch holding device which is of a durable and reliable construction.

An even further object of the present invention is to provide a new crutch holding device which is susceptible of a low cost of manufacture with regard to both materials and labor, and which accordingly is then susceptible of low prices of sale to the consuming public, thereby making such crutch holding device economically available to the buying public.

Still yet another object of the present invention is to provide a new crutch holding device which provides in the apparatuses and methods of the prior art some of the advantages thereof, while simultaneously overcoming some of the disadvantages normally associated therewith.

Still another object of the present invention is to provide a new crutch holding device for holding a pair of crutches against a wheelchair.

Yet another object of the present invention is to provide a new crutch holding device which includes an elongated flexible member having a first end and a second end. Each of the first and second ends defines a loop. Handles of a wheelchair may be extended through the loops. A first panel has a pair of side edges. Each of the side edges of the first panel is attached to the elongated flexible member such that the first panel is abutting the elongated flexible member. The first panel is positioned nearer the first end than the second end of the elongated flexible member. A second panel has a pair of side edges. Each of the side edges of the second panel is attached to the elongated flexible member such that the second panel is abutting the elongated flexible member. The second panel is positioned nearer the second end than the first end of the elongated flexible member. Each one of a pair of crutches is positioned between one of the first and second panels and the elongated member such that the elongated flexible member holds the crutches to the wheelchair.

Still yet another object of the present invention is to provide a new crutch holding device that may be retrofitted to existing wheelchairs.

Even still another object of the present invention is to provide a new crutch holding device that allows a person who is using a wheelchair to conveniently transport crutches with them.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
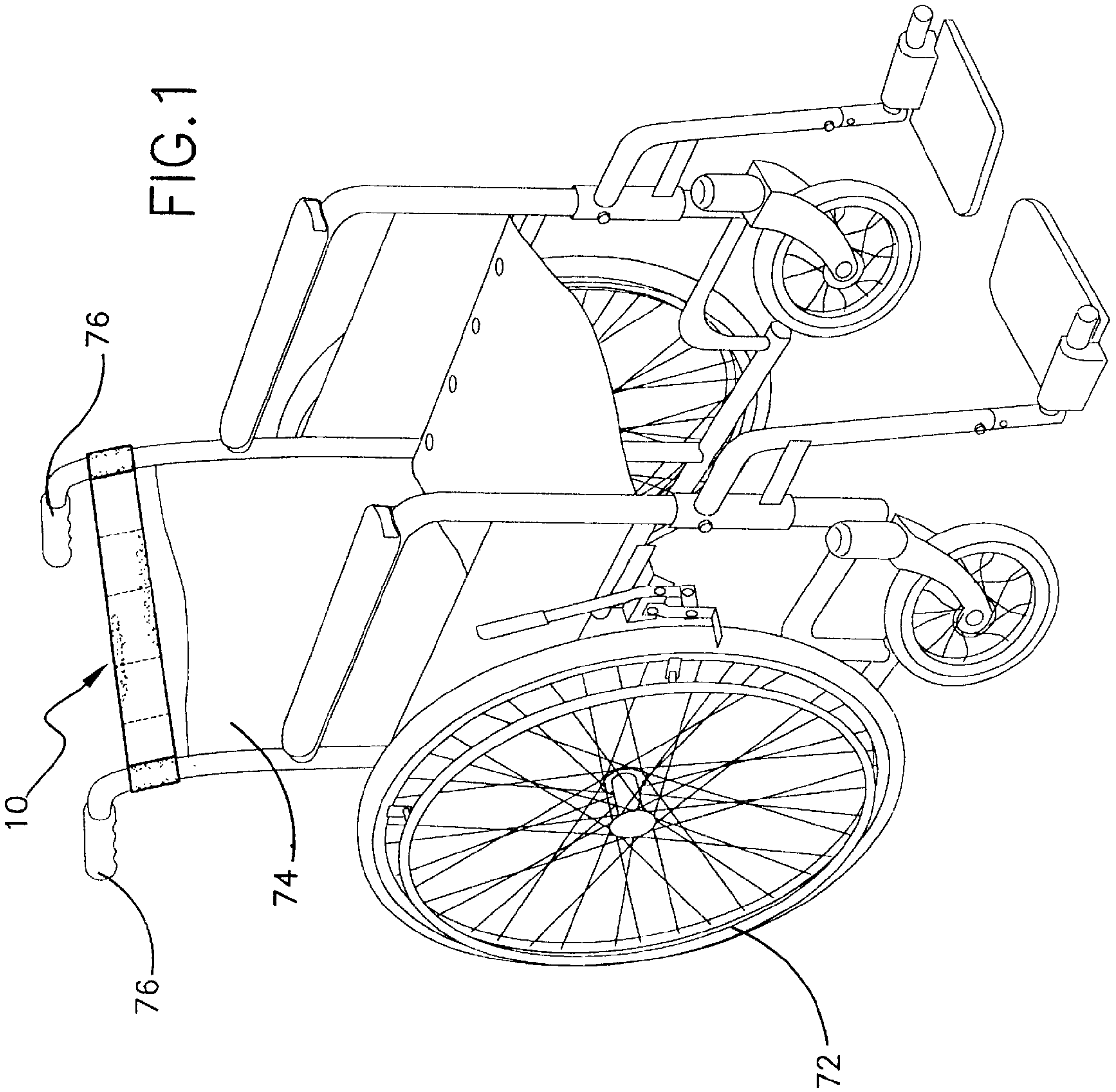
FIG. 1 is a schematic perspective view of a new crutch holding device according to the present invention.
Figure 2:
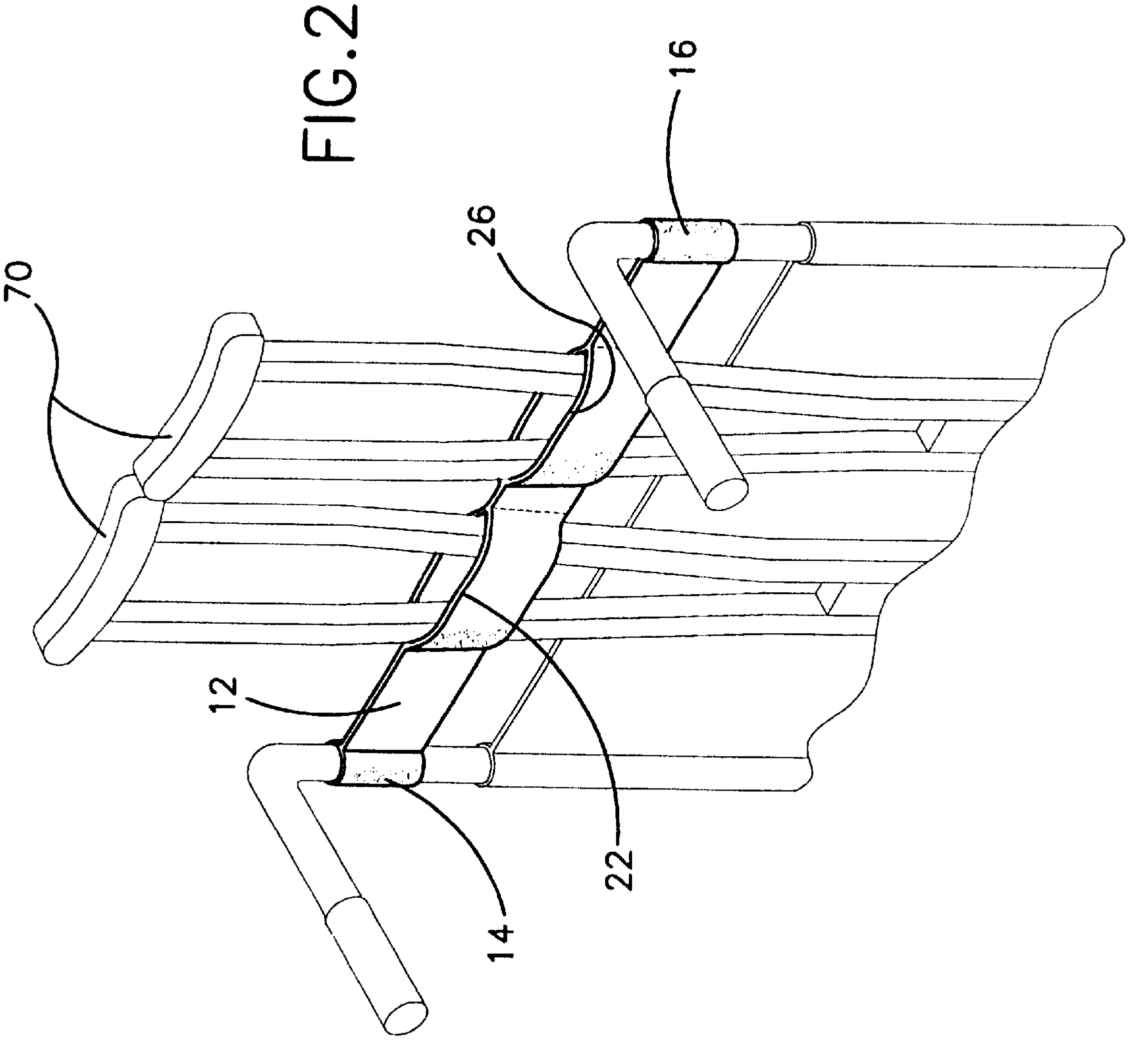
FIG. 2 is a schematic perspective in-use view of the present invention.
Figure 3:
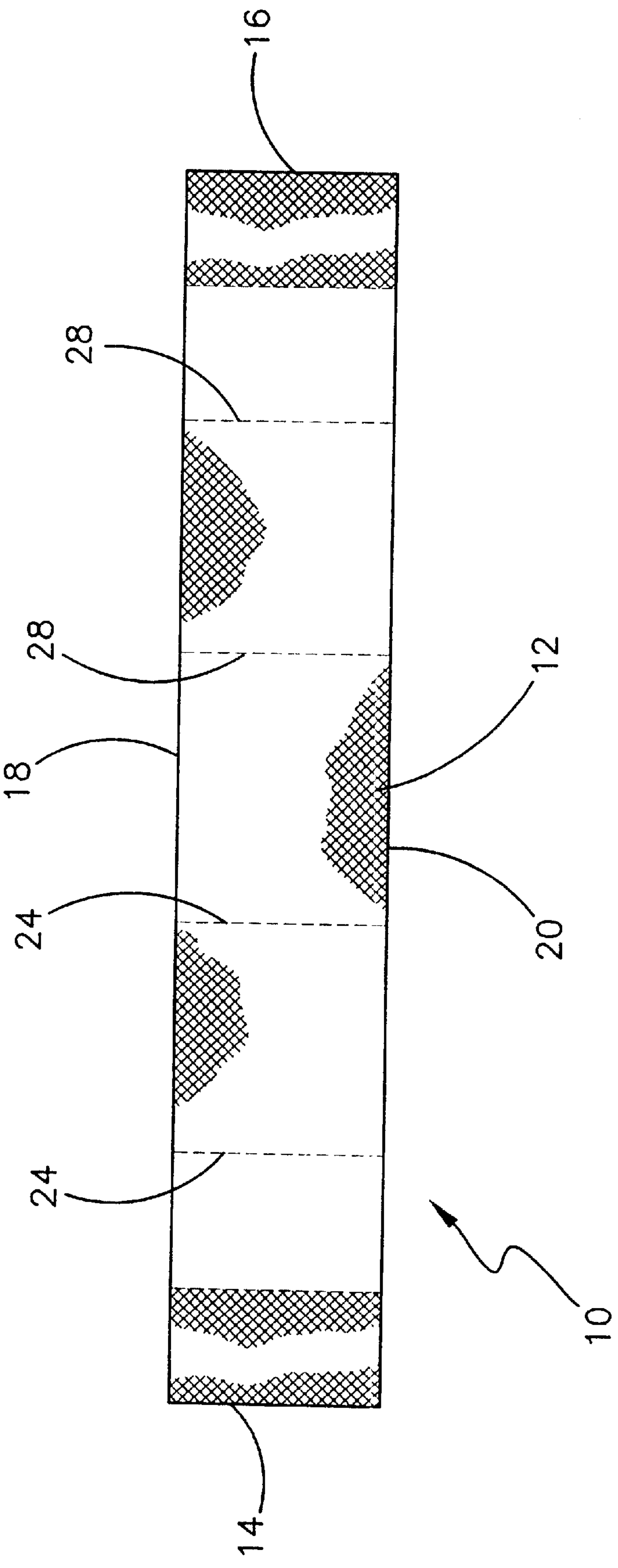
FIG. 3 is a schematic front view of the present invention.

With reference now to the drawings, and in particular to FIGS. 1 through 3 thereof, a new crutch holding device embodying the principles and concepts of the present invention and generally designated by the reference numeral 10 will be described.

As best illustrated in FIGS. 1 through 3, the crutch holding device 10 generally comprises a device for holding a pair of crutches 70 to a wheel chair 72. The wheel chair 72 is conventional and has a back portion 74 having a pair of handles 76 extending upwardly and back from the back portion 74.

The device 10 includes an elongated flexible member 12 having a first end 14 and a second end 16. Each of the first 14 and second 16 ends defines a loop. The handles 76 may be extended through the loops. The elongated flexible member 12 comprises a resiliently flexible material, preferably a spandex material. The elongated flexible member 12 has a length between the first 14 and second 16 ends generally between 24 inches and 30 inches. The elongated flexible member 12 has a width between a top edge 18 and a bottom edge 20 generally between 2 inches and 3 inches.

A first panel 22 has a pair of side edges 24. Each of the side edges 24 of the first panel 22 is attached to the elongated flexible member 12 such that the first panel 22 is abutting the elongated flexible member 12. The first panel 22 is positioned nearer the first end 14 than the second end 16 of the elongated flexible member 12.

A second panel 26 has a pair of side edges 28. Each of the side edges 28 of the second panel 26 is attached to the elongated flexible member 12 such that the second panel 26 is abutting the elongated flexible member 12. The second panel 26 is positioned nearer the second end 16 than the first end 14 of the elongated flexible member 12.

Each of the first 22 and second 26 panels comprises a resiliently elastic material, which is ideally spandex. Each of the first 22 and second 26 panels has a width generally equal to a width of the elongated flexible member 12. Each of the panels 22, 26 has a length generally between 5 inches and 8 inches.

In use, each of the crutches 70 is positioned between one of the first 22 and second 26 panels and the elongated member 12 as depicted in FIG. 2. The elongated flexible member 12 holds the crutches to the wheelchair 72 until such time as the user of the wheelchair requires them.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A crutch holding system comprising:

a wheelchair having a portion and a pair of handles extending upwardly and back from said back portion;

a pair of crutches;

an elongated flexible member having a first end and a second end, each of said first and second ends defining a loop, wherein said handles may be extended through said loops;

a first panel having a pair of side edges, each of said side edges of said first panel being attached to said elongated flexible member such that said first panel is abutting said elongated flexible member, said first panel being positioned nearer said first end than said second end of said elongated flexible member;

a second panel having a pair of side edges, each of said side edges of said second panel being attached to said elongated flexible member such that said second panel is abutting said elongated flexible member, said second panel being positioned nearer said second end than said first end of said elongated flexible member; and wherein each of said crutches is positioned between one of said first and second panels and said elongated member such that said crutches are held to said wheelchair by said elongated flexible member.

2. The crutch holding system as in claim 1, wherein said elongated flexible member comprises a resiliently flexible material.

3. The crutch holding system as in claim 1, wherein said elongated flexible member has a length between said first and second ends generally between 24 inches and 30 inches.

4. The crutch holding system as in claim 2, wherein said elongated flexible member has a width between a top edge and a bottom edge generally between 2 inches and 3 inches.

5. The crutch holding system as in claim 1, wherein each of said first and second panels comprises a resiliently elastic material.

6. The crutch holding system as in claim 5, wherein each of said first and second panels having a width generally equal to a width of said elongated flexible member, each of said panels having a length generally between 5 inches and 8 inches.

7. The crutch holding system as in claim 2, wherein each of said first and second panels comprises a resiliently elastic material.

8. The crutch holding system as in claim 7, wherein each of said first and second panels having a width generally equal to a width of said elongated flexible member, each of said panels having a length generally between 5 inches and 8 inches.

9. A crutch holding system comprising:

a wheelchair having a portion and a pair of handles extending upwardly and back from said back portion;

a pair of crutches;

an elongated flexible member having a first end and a second end, each of said first and second ends defining a loop, wherein said handles may be extended through said loops, said elongated flexible member comprising a resiliently flexible material, said elongated flexible member having a length between said first and second ends generally between 24 inches and 30 inches, said elongated flexible member having a width between a top edge and a bottom edge generally between 2 inches and 3 inches;

a first panel having a pair of side edges, each of said side edges of said first panel being attached to said elongated flexible member such that said first panel is abutting said elongated flexible member, said first panel being positioned nearer said first end than said second end of said elongated flexible member;

a second panel having a pair of side edges, each of said side edges of said second panel being attached to said elongated flexible member such that said second panel is abutting said elongated flexible member, said second panel being positioned nearer said second end than said first end of said elongated flexible member;

each of said first and second panels comprising a resiliently elastic material, each of said first and second panels having a width generally equal to a width of said elongated flexible member, each of said panels having a length generally between 5 inches and 8 inches; and wherein each of said crutches is positioned between one of said first and second panels and said elongated member such that said crutches are held to said wheelchair by said elongated flexible member.

10. A method of selectively securing a crutch to a wheelchair comprising:

providing a wheelchair having a portion and a pair of handles extending upwardly and back from said back portion;

providing a pair of crutches;

providing a crutch holding device, said crutch holding device further comprising:

an elongated flexible member having a first end and a second end, each of said first and second ends defining a loop, wherein said handles may be extended through said loops;

a first panel having a pair of side edges, each of said side edges of said first panel being attached to said elongated flexible member such that said first panel is abutting said elongated flexible member, said first panel being positioned nearer said first end than said second end of said elongated flexible member;

a second panel having a pair of side edges, each of said side edges of said second panel being attached to said elongated flexible member such that said second panel is abutting said elongated flexible member, said second panel being positioned nearer said second end than said first end of said elongated flexible member;

positioning each loop over an associated handle such that said elongated flexible member extends between said pair of handles along said back portion; and positioning each of said crutches between one of said first and second panels and said elongated member such that said crutches are held to said wheelchair by said elongated flexible member.

* * * * *